United States Patent [19]
D'Amico et al.

[11] Patent Number: 5,707,425
[45] Date of Patent: Jan. 13, 1998

[54] HELIUM RECOVERY FROM HIGHER HELIUM CONTENT STREAMS

[75] Inventors: Joseph S. D'Amico, Linthicum; Herbert Edward Reinhold, III, Annapolis, both of Md.; Kent S. Knaebel, Plain City, Ohio

[73] Assignee: Nitrotec Corporation, New York, N.Y.

[21] Appl. No.: 655,872

[22] Filed: May 21, 1996

Related U.S. Application Data

[63] Continuation-in-part of Ser. No. 326,917, Oct. 21, 1994, Pat. No. 5,542,966.
[51] Int. Cl.$^6$ .................................................. B01D 53/047
[52] U.S. Cl. .................. 95/101; 95/103; 95/105; 95/143
[58] Field of Search ................. 95/98, 100–105, 95/143–148

[56] References Cited

U.S. PATENT DOCUMENTS

| | | | |
|---|---|---|---|
| 3,101,261 | 8/1963 | Skarstrom | 55/58 |
| 3,141,748 | 7/1964 | Hoke et al. | 55/25 |
| 3,246,449 | 4/1966 | Stern et al. | 55/16 |
| 3,324,626 | 6/1967 | Dresser et al. | 95/53 X |
| 3,350,080 | 10/1967 | Garwin | 62/24 |
| 3,636,679 | 1/1972 | Batta | 55/26 |
| 3,683,589 | 8/1972 | Seitz et al. | 55/62 |
| 3,751,878 | 8/1973 | Collins | 55/58 |
| 3,797,201 | 3/1974 | Tamura | 55/62 |
| 3,838,553 | 10/1974 | Doherty | 55/58 |
| 3,944,400 | 3/1976 | Bird | 55/21 |
| 4,077,780 | 3/1978 | Doshi | 95/100 |
| 4,171,207 | 10/1979 | Sircar | 95/101 |
| 4,305,734 | 12/1981 | McGill | 55/25 |
| 4,407,779 | 10/1983 | Sircar et al. | 55/25 |
| 4,444,572 | 4/1984 | Avon et al. | 55/26 |
| 4,512,780 | 4/1985 | Fuderer | 55/26 |
| 4,529,412 | 7/1985 | Hayashi et al. | 55/25 |
| 4,539,020 | 9/1985 | Sakuraya et al. | 55/26 |
| 4,578,089 | 3/1986 | Richter et al. | 55/26 |
| 4,581,044 | 4/1986 | Uno et al. | 55/25 |
| 4,599,094 | 7/1986 | Werner et al. | 55/26 |

(List continued on next page.)

FOREIGN PATENT DOCUMENTS

| | | |
|---|---|---|
| 071 553 | 2/1983 | European Pat. Off. |
| 092 695 | 11/1983 | European Pat. Off. |
| 0 394 947 | 10/1990 | European Pat. Off. |
| 4-90819 | 3/1992 | Japan |
| WO 88/09306 | 12/1988 | WIPO |

OTHER PUBLICATIONS

C. Tannehill et al; Nitrogen Removal Costs Vary By Concentration; The American Oil & Gas Reporter; pp. 54–61; May 1994.

R.J. Buras et al; Nitrogen Rejection with Pressure Swing Adsorption: Principles, Design, and Remote Control using an Expert System—Univ. of Oklahoma Laurance Reid Gas Conf.; pp. 93–101; Feb. 28–Mar. 2, 1994.

(List continued on next page.)

Primary Examiner—Robert Spitzer
Attorney, Agent, or Firm—Cammarata & Grandinetti

[57] ABSTRACT

The present process is directed to the efficient recovery of helium gas from gas streams which contain about 25 percent by volume or more helium. The process comprises two stages of pressure swing adsorption, each stage being comprised of a plurality of interconnected adsorbent beds. In the first stage of pressure swing adsorption which is comprised of about five phases, the helium content of the gas stream is increased to 95 percent by volume or more. A secondary product gas stream from the first stage of pressure swing adsorption is fed to the second stage of pressure swing adsorption. The second stage of pressure swing adsorption increases the helium content of this primarily non-helium product gas to more than about 50 percent by volume. This gas now with a helium content of more than about 50 percent by volume is fed along with the gas stream as the input gas to the first stage of pressure swing adsorption.

14 Claims, 7 Drawing Sheets

U.S. PATENT DOCUMENTS

| | | | |
|---|---|---|---|
| 4,661,125 | 4/1987 | Haruna et al. | 55/26 |
| 4,666,468 | 5/1987 | Wu | 55/16 |
| 4,675,030 | 6/1987 | Czarnecki | 55/16 |
| 4,687,498 | 8/1987 | Maclean et al. | 62/17 |
| 4,689,062 | 8/1987 | Maclean et al. | 62/18 |
| 4,690,695 | 9/1987 | Doshi | 55/16 |
| 4,701,187 | 10/1987 | Choe et al. | 55/16 |
| 4,705,541 | 11/1987 | Sircar | 55/26 |
| 4,711,645 | 12/1987 | Kumar | 55/26 |
| 4,717,407 | 1/1988 | Choe et al. | 62/18 |
| 4,732,577 | 3/1988 | Koizumi et al. | 55/18 |
| 4,750,925 | 6/1988 | Maclean et al. | 62/18 |
| 4,752,311 | 6/1988 | Maclean et al. | 62/18 |
| 4,765,804 | 8/1988 | Lloyd-Williams et al. | 55/16 |
| 4,770,676 | 9/1988 | Sircar et al. | 55/26 |
| 4,784,672 | 11/1988 | Sircar | 55/26 |
| 4,790,858 | 12/1988 | Sircar | 55/26 |
| 4,813,977 | 3/1989 | Schmidt et al. | 55/26 |
| 4,813,980 | 3/1989 | Sircar | 55/26 |
| 4,816,039 | 3/1989 | Krishnamurthy et al. | 55/26 |
| 4,836,833 | 6/1989 | Nicholas et al. | 55/16 |
| 4,846,851 | 7/1989 | Guro et al. | 55/26 |
| 4,861,361 | 8/1989 | Jain et al. | 62/18 |
| 4,863,492 | 9/1989 | Doshi et al. | 55/16 |
| 4,869,894 | 9/1989 | Wang et al. | 95/101 X |
| 4,892,565 | 1/1990 | Schmidt et al. | 55/26 |
| 4,913,709 | 4/1990 | Kumar | 55/26 |
| 4,914,218 | 4/1990 | Kumar et al. | 95/100 |
| 4,915,711 | 4/1990 | Kumar | 55/26 |
| 5,004,482 | 4/1991 | Haas et al. | 55/16 |
| 5,006,132 | 4/1991 | DiMartino, Sr. et al. | 55/16 |
| 5,013,334 | 5/1991 | Maurer | 55/26 |
| 5,026,406 | 6/1991 | Kumar | 55/26 |
| 5,064,446 | 11/1991 | Kusuki et al. | 55/16 |
| 5,080,694 | 1/1992 | Knoblauch et al. | 55/26 |
| 5,089,048 | 2/1992 | Knoblauch et al. | 55/25 |
| 5,089,565 | 2/1992 | Knoblauch et al. | 55/26 |
| 5,112,590 | 5/1992 | Krishnamurthy et al. | 95/102 X |
| 5,133,785 | 7/1992 | Kumar et al. | 55/26 |
| 5,156,656 | 10/1992 | Parker et al. | 55/16 |
| 5,171,333 | 12/1992 | Maurer | 55/26 |
| 5,174,796 | 12/1992 | Davis et al. | 55/26 |
| 5,207,806 | 5/1993 | Lagree et al. | 55/16 |
| 5,224,350 | 7/1993 | Mehra | 62/17 |
| 5,224,507 | 7/1993 | Mehra | 62/17 |
| 5,226,931 | 7/1993 | Combier | 55/16 |
| 5,232,473 | 8/1993 | Karpoor et al. | 55/26 |
| 5,234,472 | 8/1993 | Krishnamurthy et al. | 95/98 |
| 5,248,322 | 9/1993 | Kumar | 95/101 |
| 5,332,424 | 7/1994 | Rao et al. | 95/47 |
| 5,344,480 | 9/1994 | Schulte et al. | 95/52 |
| 5,354,346 | 10/1994 | Kumar | 95/101 |
| 5,354,547 | 10/1994 | Rao et al. | 95/45 X |
| 5,382,280 | 1/1995 | Choe et al. | 95/98 |
| 5,411,721 | 5/1995 | Doshi et al. | 95/51 X |
| 5,507,856 | 4/1996 | Rao et al. | 95/50 |
| 5,542,966 | 8/1996 | D'Amico et al. | 95/101 |

OTHER PUBLICATIONS

T.C. Frankiewicz et al; Methane/Nitrogen Gas Separation over the Zeolite Clinoptilolite by the Selective Adsorption of Nitrogen; American Chemical Society, pp. 213–233; 1983.

L.H. Shendalman et al; A Study of Heatless Adsorption in the Model System $CO_2$ in He, I; Chemical Engineering Science, vol. 27, pp. 1449–1458; 1972.

J.E. Mitchell et al; Study of Heatless Adsorption in the Model System $CO_2$ in He: Part II, Esso Research and Engineering Co.; pp. 25–32; 1973.

H. C. Cheng et al; Recovery and Purification of Light Gases by Pressure Swing Adsorption; American Chemical Society; pp. 195–211; 1983.

D.E. Kowler et al; The Optimal Control of a Periodic Adsorber; Univ. of Michigan pp. 1207–1219; Nov. 1972.

P.H. Turnock et al; Separation of Nitrogen and Methane via Periodic Adsorption; Univ. of Michigan; vol. 17, No. 2, pp. 335–342; Mar. 1971.

H.C. Cheng et al; Separation of Helium–Methane Mixtures by Pressure Swing Adsorption; AIChE Journal; vol. 31, No. 1; pp. 95–102; Jan. 1985.

M.W. Ackley et al; Kinetic Separation by Pressure Swing Adsorption: Method of Characteristics Model; AIChE Journal; vol. 36; pp. 1229–1238; Aug. 1990.

G. Bird et al; Separation of Nitrogen from Helium Using Pressure–Swing Adsoprtion; Univ. of Bradford, United Kingdom, pp. 463–473; 1973.

M.S.A. Baksh et al; A New Composite Sorbent for Methane–Nitrogen Separation by Adsorption; Separation Science and Technology; pp. 845–868; 1990.

STAGE I PHASE SEQUENCES

| TIME<br>ADSORBENT BED | 0-90 SECONDS | 90-180 SECONDS | 180-270 SECONDS | 270-360 SECONDS |
|---|---|---|---|---|
| ADSORBENT BED A | ADSORPTION | DEPRESSURIZATION | EVACUATION + PURGE (1) | HELIUM PRESSURIZATION (2) |
| ADSORBENT BED B | HELIUM PRESSURIZATION (2) | ADSORPTION | DEPRESSURIZATION | EVACUATION + PURGE (1) |
| ADSORBENT BED C | EVACUATION + PURGE (1) | HELIUM PRESSURIZATION (2) | ADSORPTION | DEPRESSURIZATION |
| ADSORBENT BED D | DEPRESSURIZATION | EVACUATION + PURGE (1) | HELIUM PRESSURIZATION (2) | ADSORPTION |

(1) 15 SECONDS PURGE
(2) OPTIONAL 15 SECONDS FEED GAS PRESSURIZATION

FIG. 6

STAGE II PHASE SEQUENCES

| TIME<br>ADSORBENT BED | 0-120 SECONDS | 120-240 SECONDS | 240-360 SECONDS | 360-480 SECONDS |
|---|---|---|---|---|
| ADSORBENT BED E | ADSORPTION (1) + RECYCLE (2) | DEPRESSURIZATION | EVACUATION | HE PRESSURIZATION (3) + RECYCLE FEED PRESSURIZATION (4) |
| ADSORBENT BED F | HE PRESSURIZATION (3) + RECYCLE FEED PRESSURIZATION (4) | ADSORPTION (1) + RECYCLE (2) | DEPRESSURIZATION | EVACUATION |
| ADSORBENT BED G | EVACUATION | HE PRESSURIZATION (3) + RECYCLE FEED PRESSURIZATION (4) | ADSORPTION (1) + RECYCLE (2) | DEPRESSURIZATION |
| ADSORBENT BED H | DEPRESSURIZATION | EVACUATION | HE PRESSURIZATION (3) + RECYCLE FEED PRESSURIZATION (4) | ADSORPTION (1) + RECYCLE (2) |

(1) ADSORPTION 40 SECONDS
(2) RECYCLE 80 SECONDS
(3) HELIUM PRESSURIZATION 40 SECONDS
(4) RECYCLE PRESSURIZATION 80 SECONDS (40 SECONDS IF THERE IS FEED PRESSURIZATION)

FIG. 7

HELIUM RECOVERY FROM HIGHER HELIUM CONTENT STREAMS

This application in a continuation in part of U.S. application Ser. No. 326,917 filed Oct. 21, 1994, now U.S. Pat. No. 5,542,966.

FIELD OF THE INVENTION

This invention relates to processes for increasing the helium content of a gas stream containing higher helium contents by pressure swing adsorption. More particularly, this invention relates to pressure swing adsorption processes for the recovery of helium in a high purity from gas streams which have a content of about 25 percent by volume or more.

BACKGROUND OF THE INVENTION

Helium is a gas that is found in nature primarily along with natural gas. It cannot be synthesized. Helium is separated from natural gas and stored for use. One area of storage is in the national helium reserves. These are reserves of helium that are stored in impervious salt caverns. However, in these caverns the helium gas can become diluted with other gases. In order for it to be used for commercial or industrial purposes, it must be upgraded by removing the various contaminating gases. Also helium recovered after one use in most instances will have to be upgraded prior to another use. In most commercial and industrial uses the helium should be more than 99 percent by weight helium. For novelty uses, such as helium party balloons, the helium content can be lower. However this is not a high level of use for helium.

It has been found that a process currently being used to produce high purity helium from natural gas streams containing low levels of helium can be modified to produce high purity helium efficiently from helium streams which contain higher levels of helium. This includes gas streams which contain helium at a content of about 25 percent by volume or more. This can very effectively be used to upgrade the helium content in helium from gas reserves or helium that is used industrially but which during use becomes contaminated with other gases.

In related U.S. Pat. No. 5,542,966, there is disclosed a two stage pressure swing adsorption process to recover helium from natural gas streams where the helium content is less than about 4 percent by volume. In the first stage, the helium content is increased to about 50 percent by volume helium or more and in the second stage to more than about 95 percent by volume and preferably 99 percent by volume. It has been found that a modification of this process will effectively and efficiently increase the helium content of helium containing gas streams of more than about 25 percent by volume helium to more than about 99 percent by volume helium.

The modification consists in the particular use of the stage I and stage II pressure swing adsorption units of U.S. Pat. No. 5,542,966. The modification comprises the use of the second stage of pressure swing adsorption in U.S. Pat. No. 5,542,966 as the present first stage of pressure swing adsorption with the use of the first stage of pressure swing adsorption in U.S. Pat. No. 5,542,966 solely to take the secondary gas effluent from the first stage of pressure swing adsorption and to increase the helium content to more than about 50 percent by volume, and preferably more than about 75 percent by volume, and feed this back to the first stage of pressure swing adsorption. In this way there is a high recovery of helium. Very little helium is lost from the system.

This is an efficient approach since the main body of gas being processed flows only through one stage of pressure swing adsorption. Only the secondary product, which is a secondary gas, flows through the second stage of pressure swing adsorption. Essentially all of the helium in the gas fed to the second stage of pressure swing adsorption is recovered with little lost from the system. This processing sequence solves the problem of how to effectively and efficiently recover helium from gas streams having a higher content of helium gas.

BRIEF SUMMARY OF THE INVENTION

It has been found that a gas stream containing 25 percent by volume or more helium can be efficiently upgraded to a gas stream containing more than about 98 percent by volume helium by passage through a single stage of pressure swing adsorption stage for regeneration. The helium recovery is more than about 95 percent. The high recovery and the high product production rate is the result of the incorporation of a second pressure swing adsorption unit to process the secondary gas from the first stage of pressure swing adsorption. This first stage secondary gas is processed to a helium stream containing more than about 50 percent by volume helium, and preferably more than about 75 percent by weight helium. This upgraded helium stream is then fed to the input to the first stage of pressure swing adsorption along with an input gas. This minimizes any losses of helium from the system.

The first pressure swing adsorption stage is comprised of a plurality of adsorbent beds with each adsorbent bed undergoing five phases. These five phases are:

I—Adsorption

II—Depressurization

III—Evacuation

IV—Purge

V—Helium Pressurization

The second pressure swing adsorption stage is comprised of a plurality of adsorbent beds with each adsorbent bed sequentially undergoing six pressure swing adsorption phases. These six phases are:

I—Adsorption

II—Recycle

III—Depressurization

IV—Evacuation

V—Helium Pressurization

VI—Recycle Feed Pressurization

The higher helium content gas is fed to the first pressure swing adsorption stage. In the first pressure swing adsorption stage the adsorbent bed on phase I adsorption receives the higher content helium gas from the input source and from the second pressure swing adsorption stage. During this adsorption phase, a product helium gas having a helium content of more than 95 percent by volume, and preferably more than 99 percent by volume, is produced. Upon the completion of the phase I adsorption phase, the adsorbent bed undergoes a phase II depressurization phase. This consists of countercurrently reducing the pressure in the adsorbent bed to about ambient pressure. All of the depressurization gas produced in the depressurization phase is compressed and is flowed to the adsorbent bed on an adsorption phase. Upon the completion of the phase II depressurization phase, the adsorbent bed then undergoes a phase III evacuation phase. This consists of reducing the pressure to less than ambient pressure. The off-gas from this phase, which is a secondary gas, will be collected and flowed to the feed of the first stage. It will contain various gases including helium. Prior to completion of the evacuation phase, the adsorbent bed is purged with an amount of helium product from this first pressure swing adsorption stage. The gas flowing from the adsorbent bed during purging is likewise a secondary gas and is fed to the feed gas to the second stage. This consists of flowing some of the product helium gas countercurrently into the adsorbent bed. This removes traces of non-helium gases from the adsorbent bed and void space. The adsorbent bed then undergoes helium pressurization phase V which consists of flowing product helium gas countercurrently into the adsorbent bed. At this point the adsorbent bed has been regenerated and is ready for another phase I adsorption phase.

In the second stage pressure swing adsorption system the adsorbent bed enters a phase I adsorption phase and produces a crude helium product of more than about 50 percent by volume helium and preferably more than about 75 percent by volume helium. The feed gas is the secondary gas from the evacuation phase and purge phase of the first stage. Following the adsorption phase the adsorbent bed is regenerated. In regeneration the adsorbent bed first enters a phase II recycle phase where a recycle feed gas is produced. This is produced by compressing and feeding a part of the depressurization gas flowing countercurrently from another adsorbent bed which is on a phase III depressurization phase to this adsorbent bed. The recycle feed gas as it exits the adsorbent bed which has just completed an adsorption phase is flowed to an adsorbent bed about to go into a phase I adsorption phase. In the phase II recycle phase the depressurization gas flows through the adsorbent bed pushing the gas in the void space (which has approximately second stage feed gas composition) to the exit of the bed. The phase III depressurization comprises countercurrently reducing the pressure in the adsorbent bed, recovering a depressurization gas that is used in phase II recycle as described above, and disposing of the remainder of the depressurization gas. This remainder of depressurization gas will contain essentially no helium. At this point, the adsorbent bed undergoing phase III depressurization is at about ambient pressure and undergoes a phase IV evacuation phase to remove the adsorbed components. The adsorbent bed on phase IV evacuation is lowered in pressure to less than ambient pressure to countercurrently remove the adsorbed substances from the adsorbent bed. This gas can be recovered or vented depending on the commercial need for the gas. This gas primarily will be other gases such as nitrogen, carbon dioxide and hydrocarbons. The adsorbent bed then undergoes a phase V helium pressurization where an enriched helium gas from phase I adsorption is flowed countercurrently into the adsorbent bed. In a final phase the adsorbent bed undergoes a phase VI recycle feed pressurization where recycle feed gas from phase II recycle is fed cocurrently into the adsorbent bed. The adsorbent bed then is at about input gas pressure and is in a condition for another phase I adsorption.

Each pressure swing adsorption system is comprised of a plurality of adsorbent beds. Usually there are about three to five adsorbent beds in each pressure swing adsorption stage, and preferably about four. Each adsorbent bed in each stage sequentially will undergo the noted phases. The number of adsorbent beds used will be an economic balance between the capital cost of the installation and operating costs. The tinting of the phase in each stage will to a degree be dependent on the composition of the feed streams, the feed stream flow rates and the size of the adsorbent beds.

DETAILED DESCRIPTION OF THE INVENTION

The present processes produce a helium product having a helium content of more than 95 percent by volume, and preferably more than about 99 percent by volume, from a gas stream having a helium content of more than about 25 percent by volume at a recovery of more than 95 percent. The processes are highly efficient in producing helium at a high rate, high purity and a high recovery.

Figure 1:
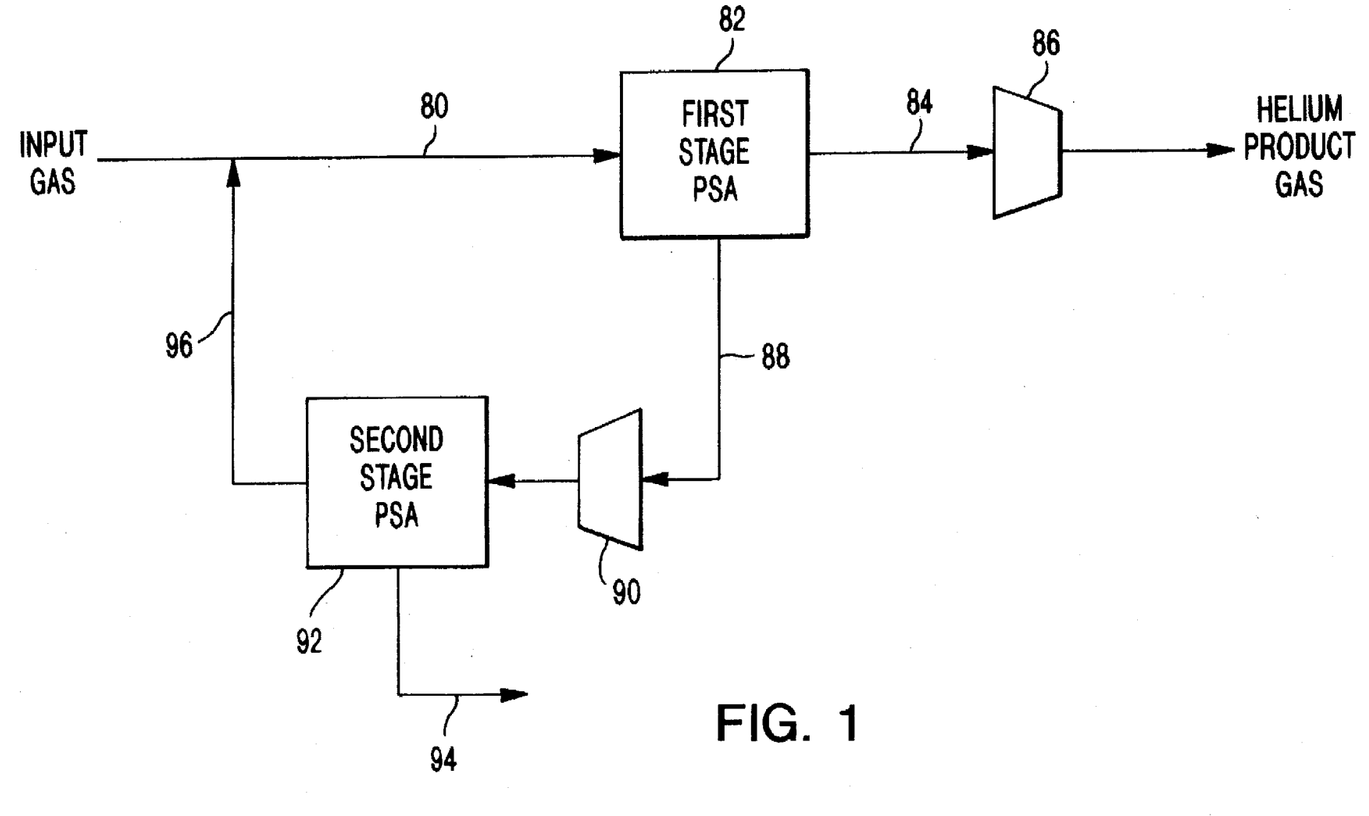
FIG. 1 is a general schematic diagram of the pressure swing adsorption system.

The processes are broadly disclosed in FIG. 1. An input gas containing more than about 25 percent by volume helium is fed into conduit 80 and from there into the first pressure swing adsorption stage 82. There are a plurality of adsorbent beds in this first stage of pressure swing adsorption. A helium gas stream containing more than about 95 percent by volume helium, and preferably more than about 99 percent by volume helium, flows through conduit 84 to compressor 86 and then to a tank storage for use. A secondary product gas flows from the first stage of pressure swing adsorption through conduit 88. This gas stream is compressed at 90 and is flowed into the second stage of pressure swing adsorption 92. A helium stream containing more than about 50 percent by volume helium, and preferably more than about 75 percent by volume helium, is flowed through conduit 96 to the input to the first stage of pressure swing adsorption. A gas stream almost completely depleted in helium exits the second stage of pressure swing adsorption at conduit 94.

Essentially any adsorbent that has an affinity for nitrogen, carbon dioxide, hydrocarbons and related gases can be used. The preferred adsorbents are activated carbons. The activated carbon can be derived from coal, wood, coconut or petroleum sources. Activated carbons that are suitable have a carbon tetrachloride number of about 60, a surface area of about 1,150 sq. meters/gram, a density of about 0.45 g./cc. and an average particle diameter of about 3 mm and preferably about 4 mm. Aluminosilicate and silica gel adsorbents also can also be used.

Figure 2:
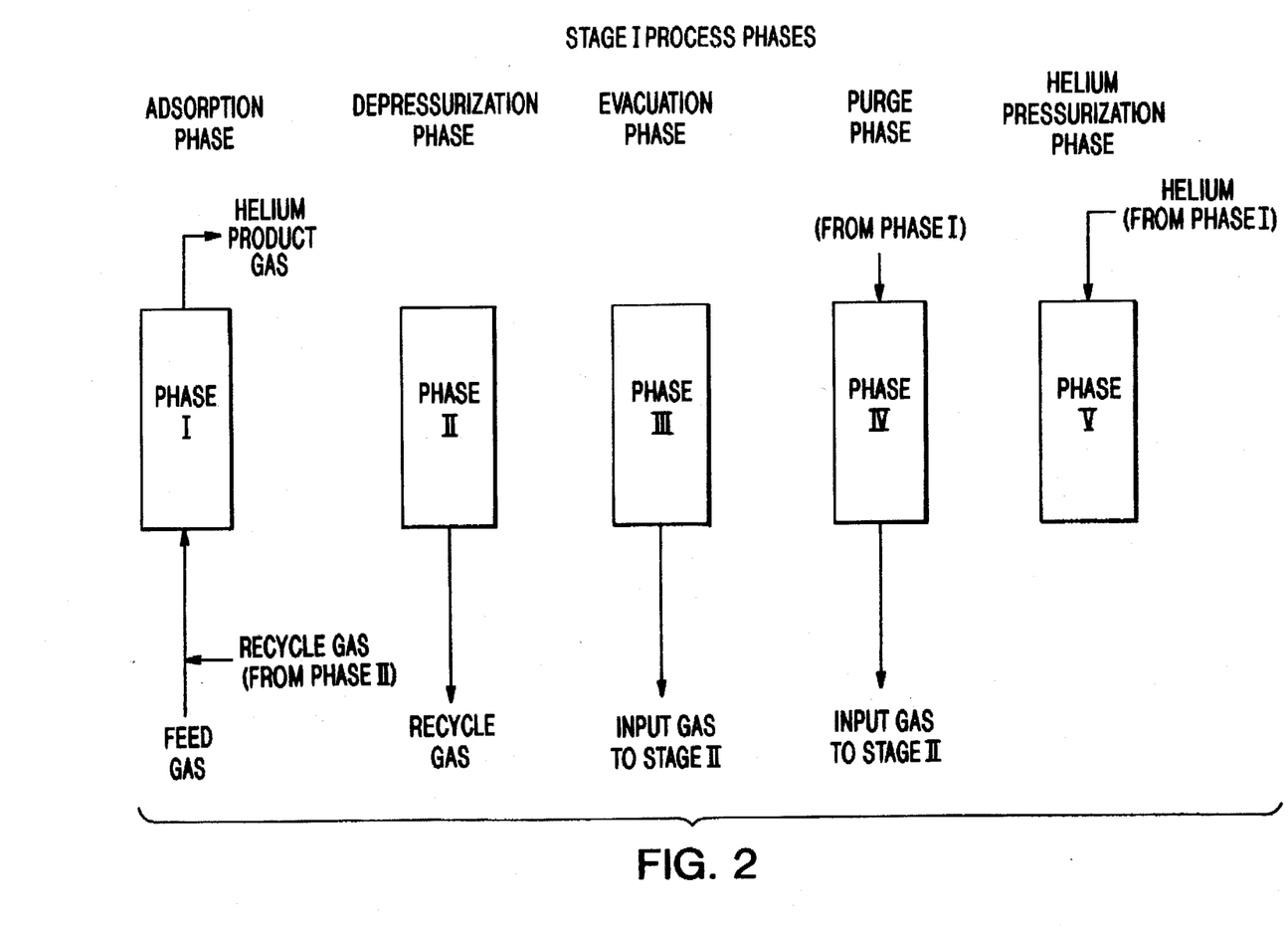
FIG. 2 is a schematic diagram of the pressure swing adsorption phases of the first stage of the helium recovery process.

The first stage pressure swing adsorption process is described in FIG. 2. This is a five phase process and is different from the second stage pressure swing adsorption process. The first phase of the first stage process is an adsorption phase and consists of passing the input helium containing gas into the adsorbent bed undergoing a first stage adsorption phase. An enriched helium gas flows from the adsorbent bed on phase I adsorption with the primarily non-helium other gases being adsorbed. A portion of this enriched helium is used in the phase IV purge phase to countercurrently flow and purge the other gases from the void space and the adsorbent in the bed undergoing this phase. Another portion of the enriched helium is flowed to phase V helium pressurization. The adsorbent bed undergoing phase V pressurization is pressurized prior to undergoing a phase I adsorption phase. The remainder, and major portion, flows to product.

Concurrently, there is an adsorbent bed undergoing a phase II depressurization. This consists of countercurrently depressurizing to about ambient pressure the adsorbent bed which has completed the phase I adsorption phase to produce a recycle gas. The recycle gas from this phase II depressurization is pressurized to about the feed gas pressure or higher and flowed along with feed gas into the adsorbent bed on phase I adsorption.

At the same time, an adsorbent bed is undergoing a phase III evacuation. This consists of reducing the pressure from ambient to more than 20 inches of Hg vacuum, and preferably to more than about 28 inches of Hg vacuum. This removes substantially all of the non-helium other gases from the adsorbent bed. This gas from the evacuation phase is recycled to stage I input gas since it can contain up to 50 percent or more by volume helium. Following the evacuation phase the adsorbent bed undergoes a phase IV purge phase. This consists of flowing an above noted portion of the helium gas from the adsorbent bed on an adsorption phase to this adsorbent bed on a purge phase. The flow is countercurrent through the adsorbent bed on the purge phase. The resulting purge gas stream which contains 50 percent or more by volume helium is flowed to the input to the first stage of pressure swing adsorption.

During this period of time another adsorbent bed has been undergoing a phase V helium pressurization phase. This consists of flowing another portion of helium gas from the adsorbent bed on a phase I adsorption phase to this adsorbent bed to at least partially pressurize this adsorbent bed. This then completes the phase sequences for the first stage of pressure swing adsorption.

Figure 3:
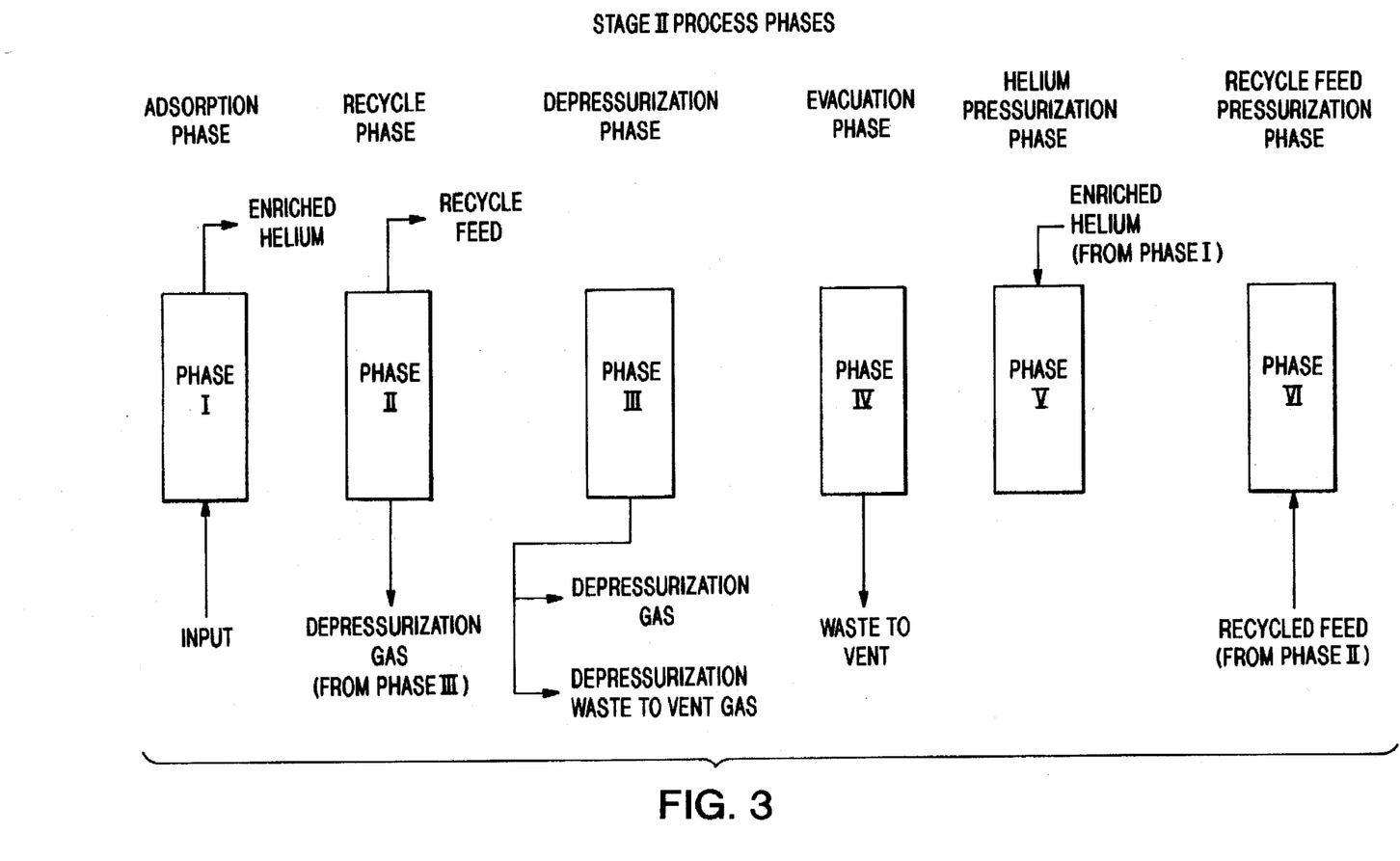
FIG. 3 is a schematic diagram of the pressure swing adsorption phases of the second stage of the helium recovery process.

The second pressure swing adsorption stage consists of six phases which are set out diagramatically in FIG. 3. In phase I adsorption an input gas stream is fed to the adsorbent bed. An enriched helium gas flows from this adsorbent bed with substantial quantities of other gases being adsorbed in the adsorbent bed. A portion of the enriched helium is used in phase V helium pressurization with the remainder flowing to the input to the first stage of pressure swing adsorption. After the adsorbent bed that is undergoing adsorption has become saturated with adsorbed other gases, it enters the recycle phase. This consists of flowing a depressurization gas from an adsorbent bed on a phase III depressurization to this adsorbent bed on phase II recycle after compressing this depressurization gas to about the input gas stream pressure or higher. This depressurization gas removes helium that is in the void space in the adsorbent bed to produce a recycle feed gas. The recycle feed gas with the helium from the void space flows from this adsorbent bed and is fed to the adsorbent bed that is on a phase VI recycle feed pressurization phase.

Concurrently an adsorbent bed is undergoing a phase III depressurization phase to produce a depressurization gas. The phase III depressurization phase consists of decreasing the pressure in an adsorbent bed to about ambient pressure. The first effluent gases from the adsorbent bed are the depressurization gas stream which is compressed and flowed through a bed which has just completed the adsorption phase. The second effluent gases are various other gases which usually are vented since they contain little or no helium. At the same time another adsorbent bed is undergoing a phase IV evacuation phase. The phase IV evacuation consists of drawing a vacuum on the adsorbent bed and countercurrently removing substantially all of the adsorbed gases from the adsorbent bed. These gases usually are flared or vented.

Simultaneously another adsorbent bed is undergoing a helium pressurization phase. In this phase enriched helium product from phase I adsorption is flowed into the adsorbent bed, preferably countercurrently. Immediately upon the completion of helium pressurization the adsorbent bed is further pressurized with recycle feed gas from phase II recycle. Preferably this latter gas is flowed cocurrently into the adsorbent bed. This adsorbent bed then will be at about the pressure of the input gas and ready for phase I adsorption.

These are the pressure swing adsorption phases that are used in stage I and in stage II. Each adsorbent bed undergoing the pressure swing adsorption process in each stage sequentially goes through the respective phases for stage I and for stage II. The timing for the phases in each stage varies with the composition of the input gas stream, gas flow rates and the size of the adsorbent beds. The timing will be governed also by the time that it takes an adsorbent bed on an adsorption phase to reach breakthrough. The input to the adsorbent bed on an adsorption phase will cease just prior to the adsorbed gases exiting (breaking through) the end of the adsorbent bed. This then will govern the timing of the other phases.

The first stage of pressure swing adsorption will be described with particular reference to FIG. 4. This input gas flows from conduit 80 through valve 112 and into conduit 114. With adsorbent bed A on a phase I adsorption phase, outlet valve 136 is open as is inlet valve 130. Valve 102 is dosed. Valves 132 and 134 of adsorbent bed A are closed, as are inlet valves 138, 146 and 154 to adsorbent beds B, C and D respectively. The feed gas flows into adsorbent bed A as also does a recycle gas from adsorbent bed D, which is on a phase II depressurization phase. Optionally some of the recycle gas can be stored in tank 121. This depressurization phase recycle gas flows through conduit 118 to compressor 122 where its pressure is increased up to about that of the feed gas or higher. A purified helium product flows through valve 136 and through conduit 124 to a product outlet with some purified helium held in storage tank 126. Throttle valve 128 regulates the pressure in conduit 124 and tank 126. Part of this purified helium will be used in the purge phase and in the phase V helium pressurization phase. The remainder is product gas.

While adsorbent bed A has been on a phase I adsorption phase, adsorbent bed D has been on a phase II depressurization phase. In this phase, outlet valve 160 and 110 are closed, as are inlet valves 154 and 156. The depressurization recycle gas flows through valve 158 and conduit 118 to compressor 122. Pressurized to about feed gas pressure or higher, the recycle gas flows through conduit 120 to conduit 114. In this part of the sequence, this recycle gas will be fed to adsorbent bed A.

Concurrently adsorbent bed C is on a phase III evacuation phase and a phase IV purge phase. In the evacuation phase outlet valves 152 and 108 are dosed as are inlet valves 146 and 150. A vacuum is drawn on conduit 116 by vacuum pump 135. This decreases the pressure in adsorbent bed C to more than about 20 inches of Hg vacuum and preferably to more than about 28 inches of Hg vacuum, which substantially removes all of the more highly adsorbed gases from this adsorbent bed C. For the phase IV helium purge phase which takes place at the end of the evacuation phase, valve 108 is opened to allow purified helium to enter adsorbent bed C and to flow countercurrently down into adsorbent bed C. Valve 148 remains open and adsorbent bed C is under a vacuum. This serves to remove the more highly adsorbed gases from the void space and the adsorbent in adsorbent bed C. The gases flowing from adsorbent bed C are flowed to the input to stage I as a part of the stage I input gas.

Additionally concurrently adsorbent bed B has been in repressurization. This first consists of a phase V helium pressurization phase. In this phase inlet valves 138, 140 and 142 are closed. Outlet valve 144 is open so that purified helium gas which is at a pressure about that of the feed gas flows countercurrently into adsorbent bed B to increase the pressure of adsorbent bed B to about that of the feed gas. Valve 106 is closed.

A preferred option is to also incorporate a feed gas pressurization into the sequence. This entails the closing of valve 144 about half to three fourths of the time through the helium pressurization phase, and preferably about two thirds of the time, and opening valve 138. This permits a repressurization to full feed gas pressure by the use of feed gas prior to valve 144 being opened and an adsorption phase initiated. When this adsorbent bed enters an adsorption phase it only will be necessary to open valve 144.

Valves 100, 104, 107 and 111 are throttle valves which are open through all phase sequences. These valves are interconnected to line 124 and the adsorbent bed exits via conduits 101, 103, 105 and 109 respectively. The flow of helium gas as a purge gas is controlled by the respective companion valve to each of these throttle valves.

This completes an operating sequence for the stage I pressure swing system. Each of the adsorbent beds sequentially goes through each of the phases. This sequence versus time is set out in FIG. 6. This is shown for a 360 second cycle which is a preferred timing. However, as with stage II, the timing is dependent on feed gas composition, feed gas pressure and flow rate and on the adsorbent bed size. In this stage each adsorbent bed contains about 5100 pounds of adsorbent and there is a gas flow of about 450 to 550 CFM.

Figure 4:
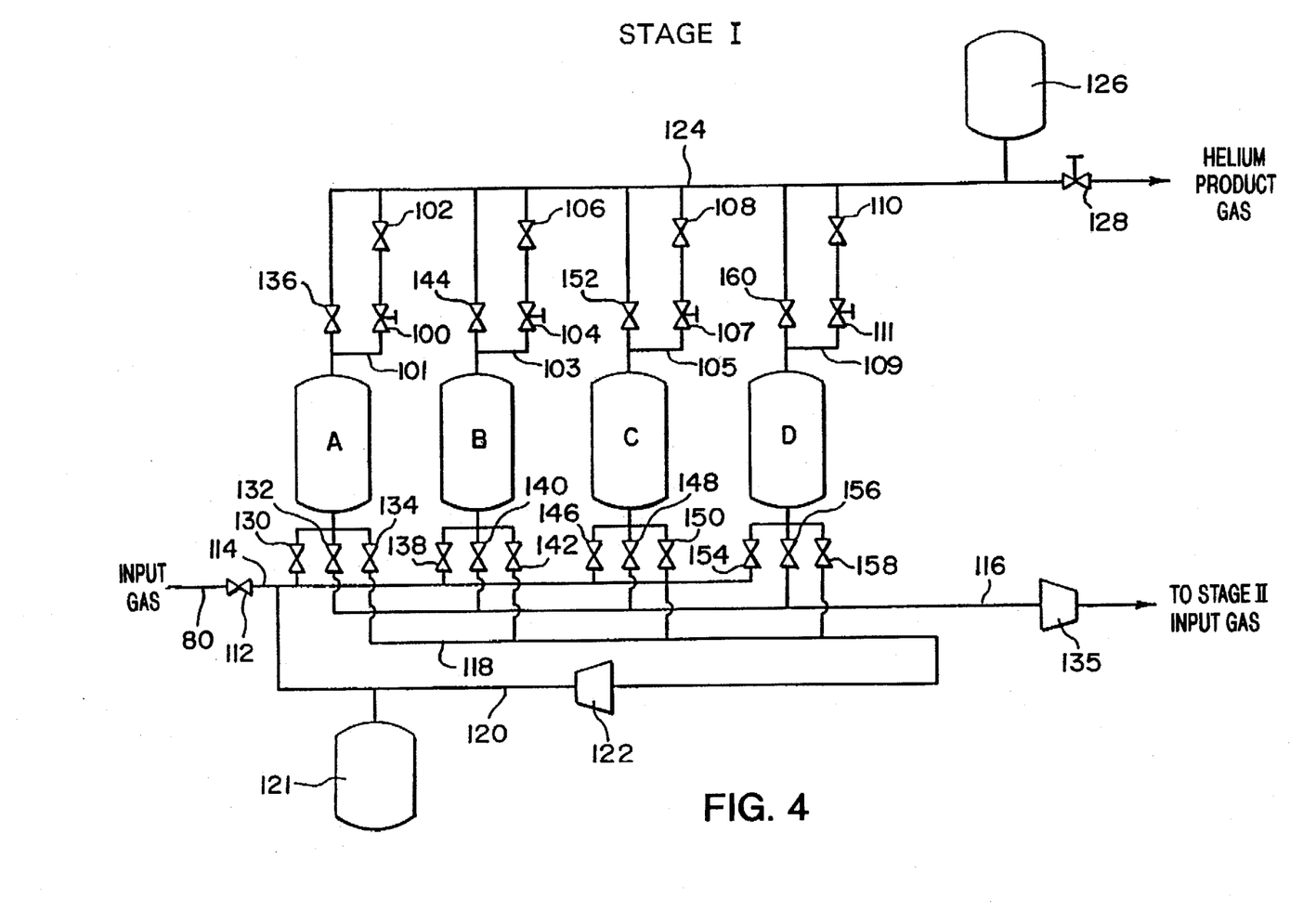
FIG. 4 is a detailed schematic diagram of the first stage pressure swing adsorption system.
Figure 6:
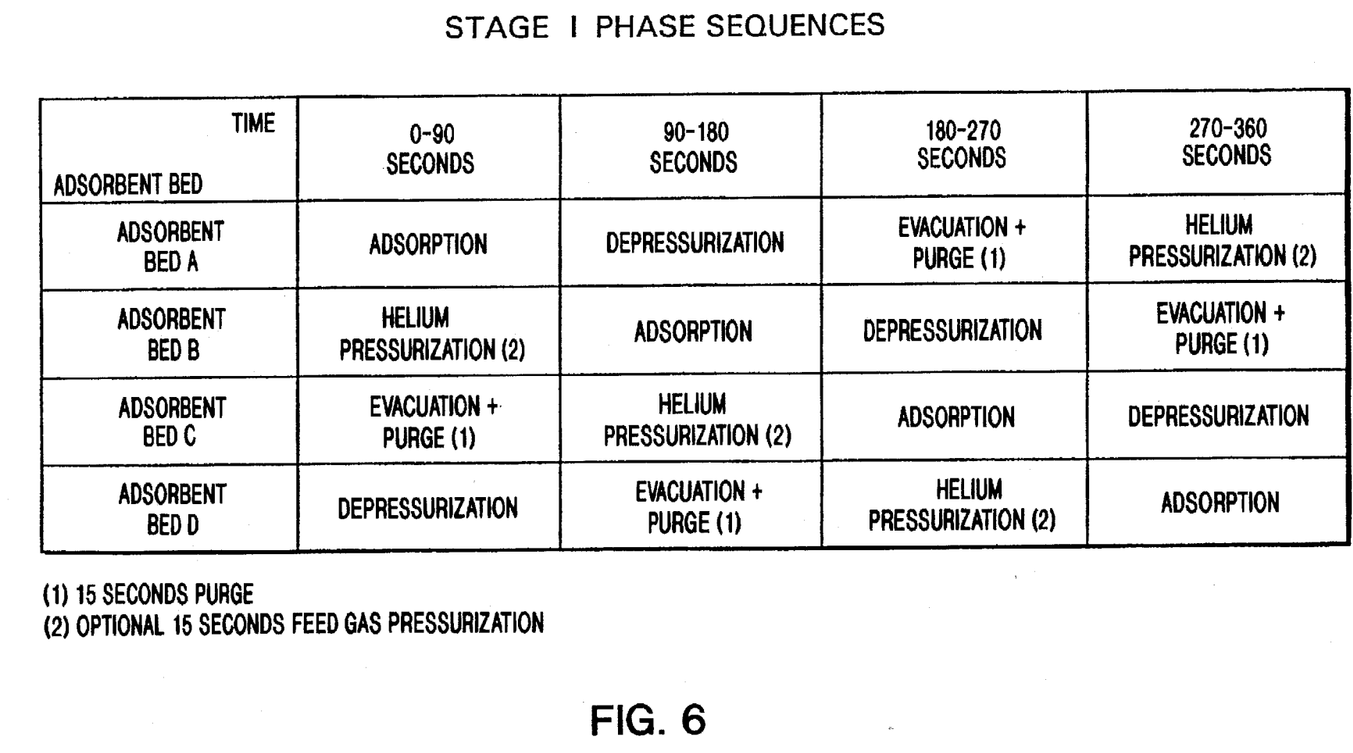
FIG. 6 is a table which sets out the phase sequences by time for the first stage pressure swing adsorption system.

Table 1 describes the position of each valve during the stage I phase sequence cycle of FIG. 6 using the pressure swing adsorption system of FIG. 4 and the phase sequences of FIG. 2.

TABLE 1

| Valve # | 0–90 sec. | 90–180 sec. | 180–270 sec. | 270–360 sec. |
|---|---|---|---|---|
| 102 | C | C | C/O(1) | C |
| 106 | C | C | C | C/O(1) |
| 108 | C/O(1) | C | C | C |
| 110 | C | C/O(1) | C | C |
| 130 | O | C | C | C/O(2) |
| 132 | C | C | O | C |
| 134 | C | O | C | C |
| 136 | O | C | C | O/C(3) |
| 138 | C/O(2) | O | C | C |
| 140 | C | C | C | O |
| 142 | C | C | O | C |
| 144 | O/C(3) | O | C | C |
| 146 | C | C/O(2) | O | C |
| 148 | O | C | C | C |
| 150 | C | C | C | O |
| 152 | C | O/C(3) | O | C |
| 154 | C | C | C/O(2) | O |
| 156 | C | O | C | C |
| 158 | O | C | C | C |
| 160 | C | C | O/C(3) | O |

Figure 5:
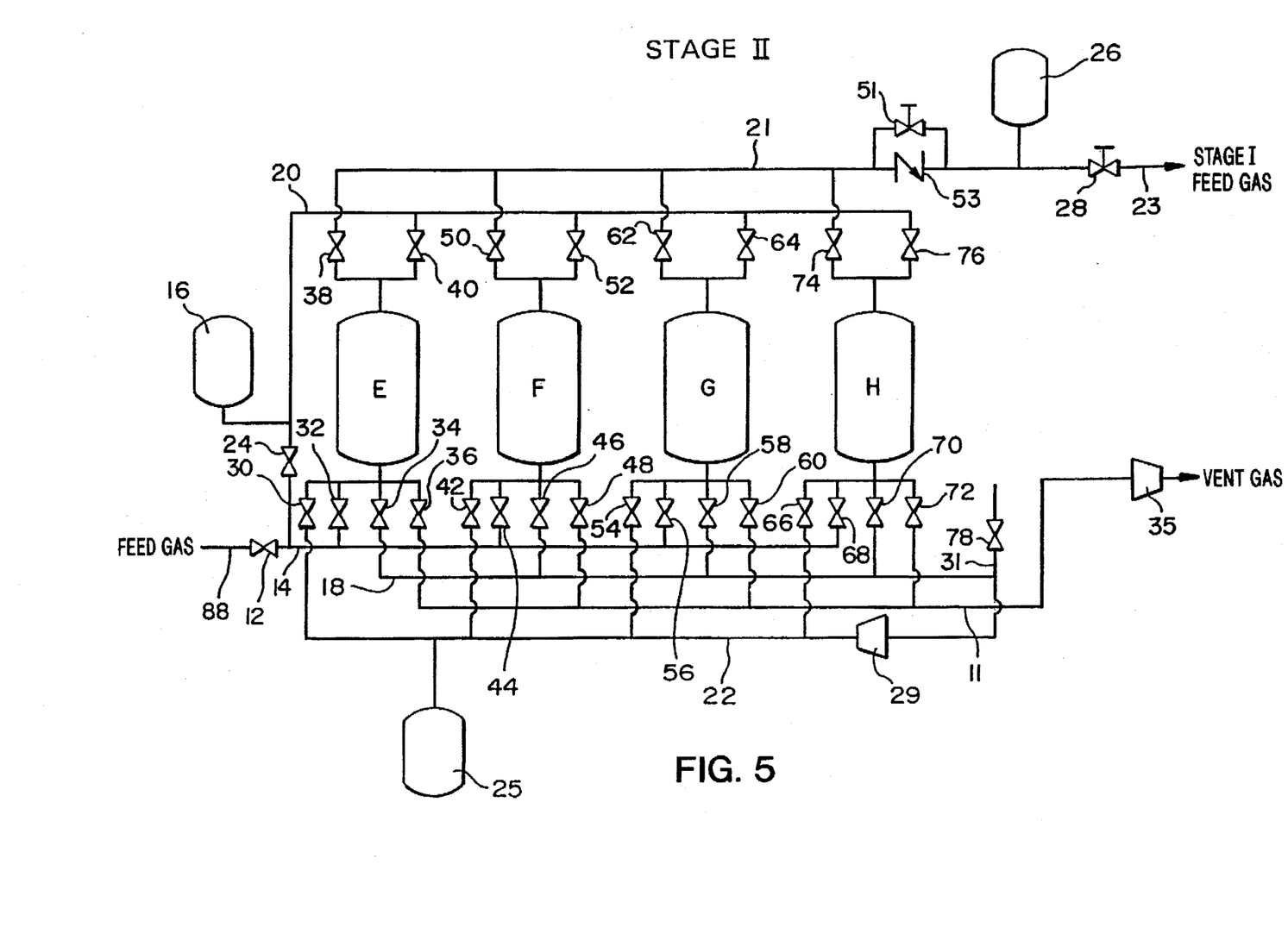
FIG. 5 is a detailed schematic diagram of the second stage pressure swing adsorption system.

(1)Closed during evacuation and open during purge
(2)Closed during helium pressurization and open during an optional feed gas pressurization of 15 seconds
(3)Open during helium pressurization and closed during an optional feed gas pressurization The stage II process will be described with particular reference to FIG. 5. The input gas stream is fed through conduit 88 and valve 12 into conduit 14 which delivers the input gas stream to the adsorbent beds. Since adsorbent bed E is on an adsorption phase, inlet valve 32 is open as is exit valve 38. Valves 30, 34 and 36 are closed as are inlet valves 44, 56 and 68 for the other adsorbent beds. Valve 24 also is closed. An enriched helium product exits adsorbent bed E and flows through conduits 21 and 23 to the feed to stage I. Throttle valves 28 and 51 and check valve 53 control the pressure in conduits 21 and 23 and enriched helium storage tank 26 which stores some of the enriched helium product from this stage II. The stored enriched helium gas is used in stage II.

Upon the completion of the adsorption phase adsorption bed E enters a recycle phase. In the recycle phase, part of the depressurization gas flowing countercurrently from adsorbent bed H which is undergoing phase III depressurization and depressurization gas from storage tank 25 is fed to adsorbent bed E from conduit 22. During this time valve 32 is closed and valve 30 is opened. On the exit end of adsorbent bed E valve 38 is closed and valve 40 is open. A recycle feed gas flows from adsorbent bed E through conduit 20 to storage tank 16 during this phase. This recycle feed gas will be used to pressurize adsorbent bed F which concurrently is undergoing a phase VI recycle feed pressurization. In order to flow this gas to adsorbent bed F valve 12 is closed and valve 24 opened. Input valves 32, 68 and 56 on the other adsorbent beds are closed and valve 44 opened. The depressurization gas during the recycle phase removes a helium gas having a helium content of about the input gas from the void space in adsorbent bed E.

While adsorbent bed E is on an adsorption phase and a recycle phase, adsorbent bed FI has been on a phase III depressurization phase. In this phase, outlet valves 74 and 76 are closed as are inlet valves 66, 68 and 72. Depressurization gas flows from adsorbent bed H through valve 70 and into conduit 18. This depressurization gas is compressed in compressor 29 to about input gas pressure and fed to adsorbent bed E which has entered onto a recycle phase. Some of the compressed depressurization gas is stored in receiver tank 25. Once all of the helium is flushed from adsorbent bed E in the recycle phase, the remaining depressurization gas flowing from adsorbent bed H can be vented through conduit 31 and valve 78.

While adsorbent bed E is on an adsorption phase and a recycle phase, and adsorbent bed H on a depressurization phase, adsorbent bed G is on a phase IV evacuation phase. In this phase outlet valves 62 and 64 and inlet valves 54, 56 and 58 of adsorbent bed G are closed. Valve 60 is opened. Evacuation gas, which is substantially the more highly adsorbed non-helium gases, flows through conduit 11 to vacuum pump 35 and is vented or otherwise used. Upon the completion of the evacuation phase, adsorbent bed G is substantially clean of the non-helium more highly adsorbed gases.

Concurrently with these operations, adsorbent bed F has been on repressurization. The first part of repressurization consists of the phase V helium pressurization phase. In this phase, all of the inlet valves to adsorbent bed F, valves 42, 44, 46 and 48, are closed. Outlet valve 52 also is closed. However, outlet valve 50 is opened so that enriched helium gas will flow countercurrently into adsorbent bed F. Upon the completion of helium pressurization, valve 80 is closed and inlet valve 44 is opened. At this time inlet valve 12 is closed and recycle valve 24 is opened. This allows a recycle feed gas to flow into adsorbent bed F through conduit 14 from storage tank 16. This will repressurize adsorbent bed F to about the input feed gas pressure.

A preferred option is to incorporate a short input gas repressurization just prior to the adsorption phase. In this mode up to about half of the recycle feed repressurization time is transferred to an input gas repressurization time. In this preferred option it only is required that valve 24 be closed and valve 12 opened. Since adsorbent bed F will be entering an adsorption phase in the next sequence, this will remain the position of these valves. During an input gas pressurization of adsorbent bed F outlet valves 50 and 52 remain closed. When adsorbent bed F enters the adsorption phase it then will be necessary only to open valve 50.

Figure 7:
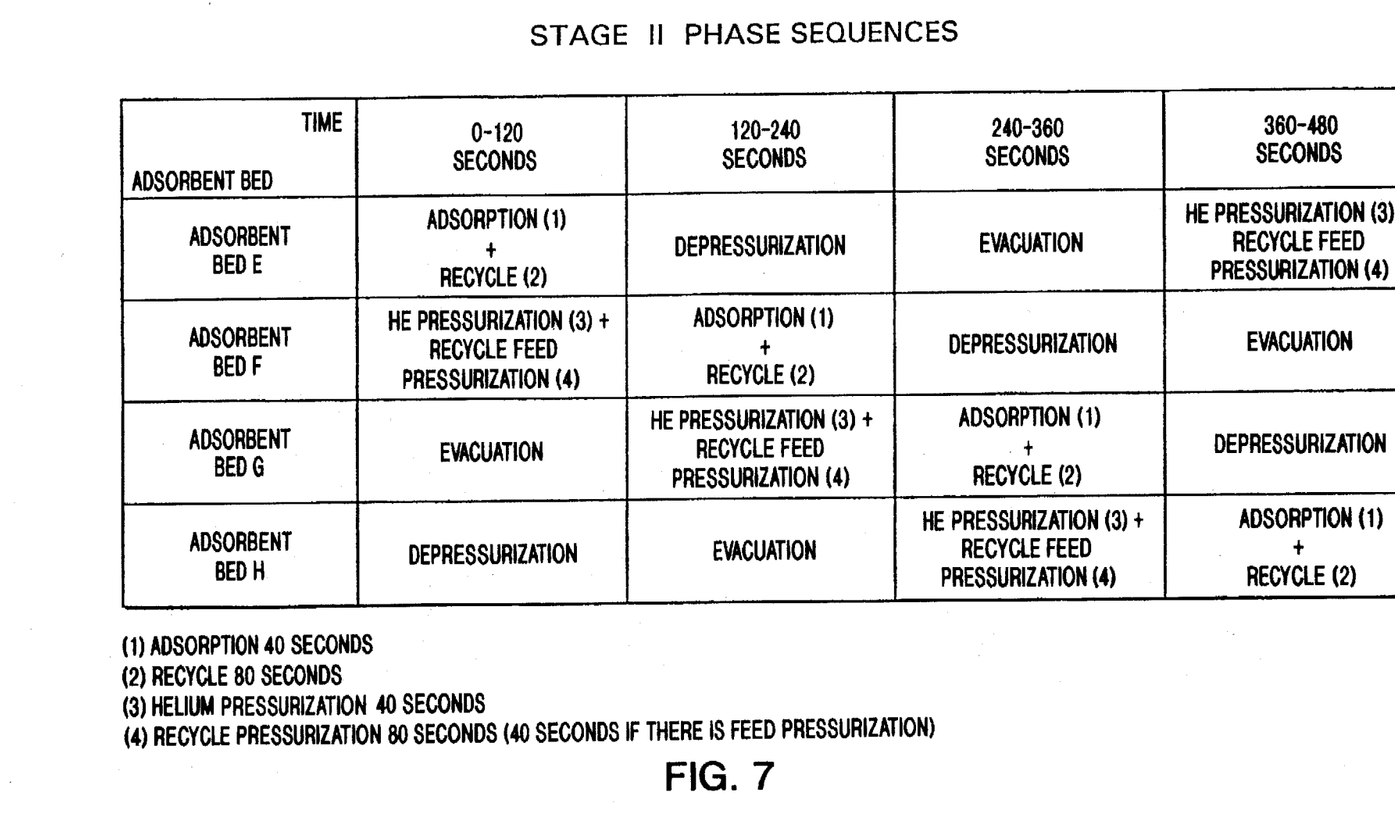
FIG. 7 is a table which sets out the phase sequences by time for the second stage pressure swing adsorption system.

This describes a full sequence of the operation of the stage II pressure swing adsorption system. This produces an enriched helium which contains more than about 50 volume percent helium, and preferably more than about 75 volume percent helium. The adsorbent beds then sequentially go through the phase sequences as set out in FIG. 7. A useful timing for a full cycle is 480 seconds. However, timing is dependent on input gas stream composition, pressure and flown rates as well as adsorbent bed size. If a feed pressurization step is used in the repressurization of the adsorbent beds this usually will be for a period of about 40 seconds. This timing is for adsorbent beds which contain about 1800 pounds of adsorbent, a feed gas pressure of about 50 psia and a flow rate of about 200 to 250 cubic feet per minute, and preferably about 240 cubic feet per minute. Table 2 gives the valve position versus time during a cycle of the stage II pressure swing adsorption system. The full operation of the stage II process is fully described with reference to the pressure swing adsorption system of FIG. 5, the phase sequences of FIG. 3, the stage II phase sequence cycle of FIG. 7 and the valve position of Table 2.

TABLE 2

| Valve # | 0–120 sec. | 120–240 sec. | 240–360 sec. | 360–480 sec. |
|---|---|---|---|---|
| 12 | O/C[1] | O/C[1] | O/C[1] | O/C[1] |
| 24 | C/O[2] | C/O[2] | C/O[2] | C/O[2] |
| 30 | C/O[4] | C | C | C |
| 32 | O/C[3] | C | C | C/O[5] |
| 34 | C | O | C | C |
| 36 | C | C | O | C |
| 38 | O/C[3] | C | C | O/C[6] |
| 40 | C/O[4] | C | C | C |
| 42 | C | C/O[4] | C | C |
| 44 | C/O[5] | O/C[3] | C | C |
| 46 | C | C | O | C |
| 48 | C | C | C | O |
| 50 | O/C[6] | O/C[3] | C | C |
| 52 | C | C/O[4] | C | C |
| 54 | C | C | C/O[4] | C |
| 56 | C | C/O[5] | O/C[3] | C |
| 58 | C | C | C | O |
| 60 | O | C | C | C |
| 62 | C | O/C[6] | O/C[3] | C |
| 64 | C | C | C/O[4] | C |

TABLE 2-continued

| Valve # | 0–120 sec. | 120–240 sec. | 240–360 sec. | 360–480 sec. |
|---|---|---|---|---|
| 66 | C | C | C | C/O[4] |
| 68 | C | C | C/O[5] | O/C[3] |
| 70 | O | C | C | C |
| 72 | C | O | C | C |
| 74 | C | C | O/C[6] | O/C[3] |
| 76 | C | C | C | C/O[4] |
| 78 | C/O[7] | C/O[7] | C/O[7] | C/O[7] |

[1]Open during adsorption and closed during recycle feed pressurization
[2]Closed during adsorption and open during recycle feed pressurization
[3]Open during adsorption and closed during recycle
[4]Closed during adsorption and open during recycle
[5]Closed during helium pressurization and open during recycle feed pressurization
[6]Open during helium pressurization and closed during recycle feed pressurization
[7]Closed during the first part of depressurization.

This valve position sequence is for a preferred operation of the present process as is the phase and cycle timing. The valve position sequence and the phase and cycle timing can be modified and yet remain within the scope of the present processes.

The two position valves that are used are valves which are either open or closed usually are butterfly valves. Valves 28, 51 and 128 are throttle valved that remain open in a constricted condition.

The combined stage I and stage II pressure swing systems will produce a helium gas product of more than about 90 percent by volume helium, and preferably more than about 98 percent by volume helium. The pressure swing system can be fully automated with a central processor controlling all of the flows and valve sequencing. The valves are rated for the pressures of the systems. The tanks and conduits likewise must be rated for the operating pressures.

This description sets out the preferred operation of the stage I and stage II pressure swing systems to produce a highly enriched product. The full scope of the invention is more particularly set out and described in the appended claims.

What is claimed is:

1. A method for the separation of helium from an input gas containing helium in a concentration of more than about 25 percent by volume and other gases by selectively adsorbing said other gases utilizing at least a first stage and a second stage of pressure swing adsorption, each stage comprised of a plurality of interconnected adsorbent beds, comprising feeding said input gas to an input to said first stage of pressure swing adsorption and recovering a first stage helium product gas containing more than about 95 percent by weight helium, recovering a first stage secondary product gas from said first stage of pressure swing adsorption and flowing said first stage secondary product gas to said second stage of pressure swing adsorption as a sole feed gas to said second stage of pressure swing adsorption, recovering a second stage helium product gas from said second stage of pressure swing adsorption and feeding said second stage helium product gas to said input gas to said first stage of pressure swing adsorption along with said input gas.

2. A method as in claim 1 wherein said second stage helium product gas contains more than about 50 percent by volume helium.

3. A method as in claim 1 wherein said second stage helium product gas contains more than about 75 percent by volume helium.

4. A method for the separation of helium as in claim 1 wherein in said first stage of pressure swing adsorption there are five phases, each interconnected adsorbent bed undergoing said five phases for a complete cycle, said five phases comprising in sequence an adsorption phase, a depressurization phase, an evacuation phase, a purge phase and a helium pressurization phase, flowing said input gas along with said second stage helium product gas from said second stage to an adsorbent bed in said first stage undergoing said adsorption phase with said first stage helium product gas flowing therefrom.

5. A method for the separation of helium as in claim 4 comprising flowing a first portion of said first stage helium product gas to purge other gases from an adsorbent bed in said purge phase, flowing a second portion of said first stage helium product gas to an other adsorbent bed that has completed said purge phase and which is to enter said adsorption phase to pressurize said other adsorbent bed, and flowing a third portion of said first stage helium product gas from said first stage of pressure swing adsorption.

6. A method for the separation of helium as in claim 4 wherein there are at least four adsorbent beds, feeding said input gas to a first adsorbent bed in said first stage and collecting three portions of said first stage helium product gas therefrom, concurrently depressurizing a fourth adsorbent bed of said first stage which has completed the production of said first stage helium product gas and which contains substantial amounts of said other gases, recovering an effluent first stage recycle gas from said fourth adsorbent bed of said first stage and pressurizing said first stage recycle gas to about the pressure of said input gas to said first stage and flowing said first stage recycle gas to said first adsorbent bed of said first stage, concurrently reducing the pressure in a third adsorbent bed of said first stage to less than about ambient pressure and removing a portion of said other gases therefrom, followed by flowing a first portion of said first stage helium product gas from said first adsorbent bed of said first stage to said third adsorbent bed of said first stage upon the completion of said evacuation phase as a purge gas and further removing said other gases therefrom, concurrently flowing a second portion of said first stage helium product gas to a second adsorbent bed of said first stage to increase the pressure within said second adsorbent bed of said first stage, and flowing at least a portion of said first stage secondary product gas from said third adsorbent bed as said feed gas to said second stage of pressure swing adsorption.

7. A method for the separation of helium as in claim 1 wherein in said second stage of pressure swing adsorption there are six phases, each interconnected adsorbent bed undergoing said six phases for a complete cycle, said six phases comprising in sequence an adsorption phase, a recycle phase, a depressurization phase, an evacuation phase, a helium pressurization phase and a recycle feed pressurization phase.

8. A method for the separation of helium as in claim 7 wherein in said second stage of pressure swing adsorption a portion of the effluent gas from an adsorbent bed on said depressurization phase is pressurized to about the pressure of said second stage feed gas to said adsorption phase and being flowed to an adsorbent bed on said recycle phase with an effluent recycle feed gas enriched in helium flowing therefrom, said recycle feed gas is flowed to an adsorbent bed that is to enter said adsorption phase to pressurize such adsorbent bed to about a pressure at which said second stage of pressure swing adsorption is operating.

9. A method for the separation of helium as in claim 8 wherein there are at least four adsorbent beds, feeding said first stage secondary product gas to the input end of a first adsorbent bed of said second stage entering on said adsorption phase and selectively adsorbing said other gases, collecting a gas enriched in helium flowing from said first adsorbent bed of said second stage and flowing a portion thereof to said first stage pressure swing adsorption and a portion thereof to a second adsorbent bed of said second stage that has completed said evacuation phase and that has entered said helium pressurization phase, concurrently depressurizing a fourth adsorbent bed of said second stage and collecting an effluent second stage recycle gas, pressurizing said second stage recycle gas to about the pressure of said second stage feed gas stream and flowing said second stage recycle gas to said first adsorbent bed of said second stage upon the completion of said adsorption phase and the initiation of said recycle phase, flowing the effluent from said first adsorbent bed of said second stage during said recycle phase to a second adsorbent bed of said second stage upon the completion of said helium pressurization phase and that is to enter said adsorption phase to pressurize said second adsorbent bed of said second stage to about second stage feed gas pressure, and concurrently evacuating a third adsorbent bed of said second stage that has completed said depressurization phase to remove said other gases therefrom.

10. A method for the separation of helium as in claim 9 wherein said second adsorbent bed of said first stage is further pressurized with input gas prior to entering said adsorption phase.

11. A method for the separation of helium as in claim 1 wherein each of said adsorbent beds contains an adsorbent comprising an activated carbon.

12. A method for the separation of helium from an input gas stream containing helium and other gases by selectively adsorbing said other gases in a first stage of pressure swing adsorption, said first stage of pressure swing adsorption consisting of at least four interconnected adsorbent beds, each adsorbent bed undergoing five phases for each complete cycle of pressure swing adsorption, said five phases comprising in sequence an adsorption phase, a depressurization phase, an evacuation phase, a purge phase and a helium pressurization phase, feeding said input gas to a first adsorbent bed of said first stage and collecting three portions of a first stage helium product gas therefrom, concurrently depressurizing a fourth adsorbent bed of said first stage which has completed the production of said first stage helium product gas and which contains substantial amounts of said other gases, recovering an effluent first stage recycle gas from said fourth adsorbent bed of said first stage and pressurizing said first stage recycle gas to about the pressure of said input gas to said first stage and flowing said first stage recycle gas to the input gas to said first adsorbent bed of said first stage, concurrently reducing the pressure in a third adsorbent bed of said first stage to less than about ambient pressure and removing at least a portion of said other gases therefrom, concurrently flowing a first portion of first stage helium product gas from said first adsorbent bed of said first stage to said third adsorbent bed of said first stage which has completed said evacuation phase as a purge gas and further removing said other gases therefrom, concurrently flowing a second portion of said first stage helium product gas to a second adsorbent bed of said first stage to increase the pressure within such adsorbent bed, and flowing said other gases from said third adsorbent bed of said first stage as a first stage secondary product gas to a first adsorbent bed in a second stage of pressure swing adsorption, said second stage of pressure swing adsorption comprising an adsorption phase, a recycle phase, a depressurization phase, an evacuation phase, a helium pressurization phase and a recycle feed pressurization phase, feeding said first stage secondary product gas to the input end of a first adsorbent bed of said second stage entering on said adsorption phase as a feed gas and selectively adsorbing other gases therefrom, collecting a second stage helium product gas flowing from said first adsorbent bed of said second stage and flowing a portion thereof to a second adsorbent bed of said second stage that has completed said evacuation phase and that has entered said helium pressurization phase, concurrently depressurizing a fourth adsorbent bed of said second stage and collecting an effluent second stage recycle gas, pressurizing said second stage recycle gas to about the pressure of said second stage feed gas and flowing said pressurized second stage recycle gas to said first adsorbent bed of said second stage upon the completion of said adsorption phase and the initiation of said recycle phase, flowing the effluent from said first adsorbent bed of said second stage during said recycle phase to a second adsorbent bed of said second stage upon the completion of said helium pressurization phase and that is to enter said adsorption phase to pressurize said second adsorbent bed of said second stage to about second stage feed gas pressure, concurrently evacuating a third adsorbent bed of said second stage that has completed said depressurization phase to remove said other gases therefrom, flowing the remaining portion of said second stage helium product gas to said first stage of pressure swing adsorption along with said input gas.

13. A method for the separation of helium as in claim 12 wherein each adsorbent bed contains an adsorbent comprising an activated carbon.

14. A method for the separation of helium as in claim 13 wherein said second adsorbent bed of said second stage is further pressurized with first stage secondary product gas prior to entering said adsorption phase.

* * * * *